May 26, 1970 — G. BESSE — 3,514,133
LEAK-PROOF DEVICES FOR CONNECTING SIMILAR PIPES AND HOSES
Filed March 26, 1968

Inventor:
Georges Besse
By Michael S. Striker
Attorney

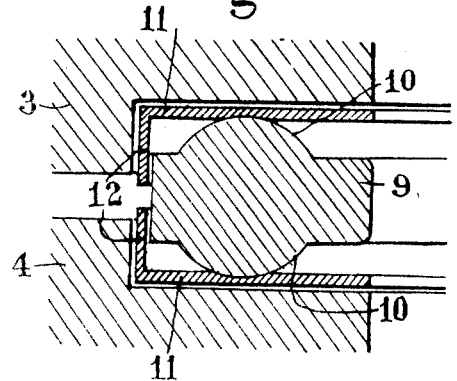
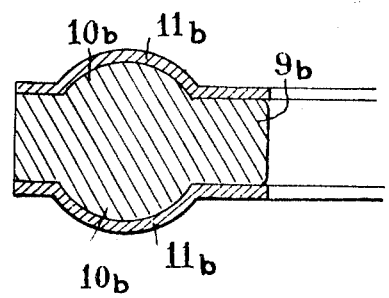
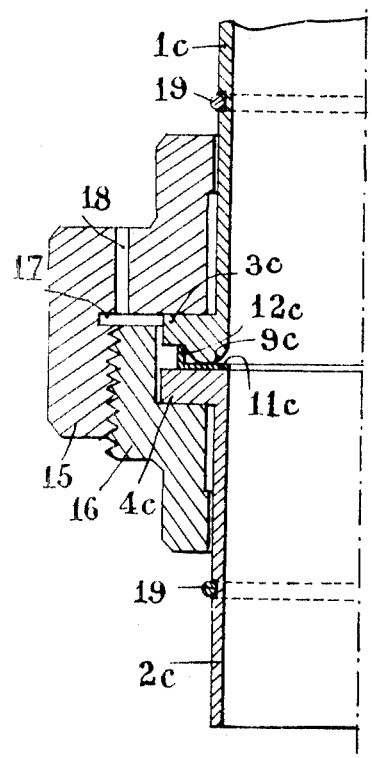
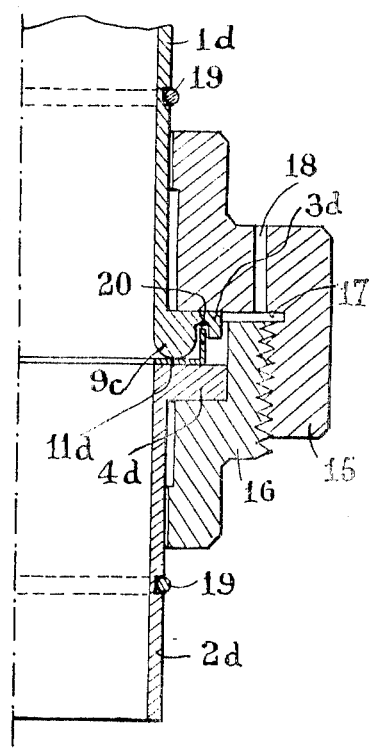

United States Patent Office 3,514,133
Patented May 26, 1970

3,514,133
LEAK-PROOF DEVICES FOR CONNECTING SIMILAR PIPES AND HOSES
Georges Besse, Fontenay-aux-Roses, France, assignor to Societe d'Etudes et de Developpement des Industries Modernes (S.E.D.I.M.), Hauts-de-Seine, France, a corporation
Filed Mar. 26, 1968, Ser. No. 716,012
Claims priority, application France, Mar. 30, 1967, 100,743; Feb. 21, 1968, 140,609
Int. Cl. F16l *17/00*
U.S. Cl. 285—336     2 Claims

ABSTRACT OF THE DISCLOSURE

A fluid-tight joint for a pair of tubular members in which at least one washer of ductile material and an intermediate ring of a hardness substantially equal to that of the tubular members are sandwiched between substantially parallel plane faces of the tubular members extending transverse to the aligned axes thereof with at least one convex face of the ring engaging the washer and in which means cooperate with the tubular members for forcibly drawing the same toward each other so as to press the convex face of the ring into the ductile washer while the latter rests on the plane face of one of the members.

---

The present invention relates to joints or like fitting for connecting in a leak-proof manner two similar pipes or hoses.

Many different types of devices of this character are already known. As a rule, they comprise two complementary members adapted to be secured beforehand to the pipe ends to be coupled, clamping and sealing means being also provided for assembling these two members in a fluid-tight manner. Thus, some of these known leak-proof joints comprise two tubular members formed with integral coupling flanges adapted to be assembled by means of bolts, a gasket being interposed between the two flanges.

However, the present invention relates more particularly to pipe coupling means capable of warranting a complete fluid-tightness of the joint whether against pressure or vacuum, including deep vacuum, in all cases wherein the use of rubber or other elastomeric gasket is precluded on account either of the particular nature of the fluid circulating in the pipes or of the temperature or pressures contemplated under certain service conditions.

When extreme problems of this character are to be solved it is now customary to use metal gaskets of various types. Thus, axial-clamping flat metal gaskets are used, but they are satisfactory only if their thickness is relatively reduced and when a considerable force is exerted for producing the requisite fluid-tightness and preserve same in spite of temperature variations.

Tapered gaskets to which an axial clamping pressure is applied are also known, but these are objectionable on account of the risk of slippage of the contact surfaces during the clamping operation, which may be a cause of seizing and scoring. Besides, these gaskets require a very accurate machining.

It is also known to use radially-clamped gaskets of which the chief drawback is the necessity of machining the sealing surfaces with a high degree of precision. Moreover, with these gaskets it is not possible to use an internal energy for compensating differences in the coefficients of thermal expansion between each gasket and the adjacent flanges.

Finally, the use of knife joints is also known, but these joints require a lateral locking force to prevent side creep, this requirement accounting for the necessarily close machining tolerances. Besides, these particularly fragile knives project from the joint, and the tightening operation is relatively long for the degree of penetration of the knives must be constantly checked.

Under these conditions, it is clear that the various devices now used for making leak-proof joints between similar pipes or hoses are attended by various drawbacks. It is therefore the object of this invention to provide a novel leak-proof device for connecting pipes or hoses, wherein the sealing means are designed with a view to completely eliminate these drawbacks.

To this end, the present invention provides a device for coupling two similar pipes or hoses in a fluid-tight manner, this device being of the type comprising two complementary members adapted to be secured beforehand to the ends of the pipes or like elements to be interconnected, and means for assembling, and providing a fluid-tight joint between said members, this device being characterised in that the sealing means contemplated therein consists on the one hand of a ring made from a material having a hardness similar to that of the aforesaid complementary members, said ring being adapted to be disposed between the registering faces of said complementary members, and on the other hand of a layer of ductile material interposed between said ring and each complementary member, the cross-sectional contour of said intermediate ring comprising at least one convex portion registering with each complementary member.

According to a specific form of embodiment of the device of this invention, said complementary members consist of a pair of tubular coupling sockets formed with integral flanges adapted to be assembled by means of clamping bolts. In this case, the intermediate ring adapted to be interposed between said coupling sockets is fitted in an annular recess consisting of registering inner annular grooves formed in the flanges of said tubular sockets.

Thus, when these flanges are tightened up the opposite faces of the sealing ring penetrate into the registering layers of ductile material and form therein an impression of corresponding cross-sectional contour. Under these conditions, a highly reliable fluid-tightness is obtained.

In a modified form of embodiment of the device of this invention, said complementary coupling members consist of tubular sockets formed with integral collar portions adapted to be disposed in axial alignment and to be assembled by means of any suitable connecting members, such as screw nuts or rings.

In this device the intermediate ring to be disposed between the two tubular sockets is carried by the collar of one of these sockets, on the face thereof which is to register with the collar of the other socket, and a single layer of ductile material is interposed between the other socket's collar and said intermediate ring.

With this device the fluid-tightness of the joint is as perfect as with the preceding form of embodiment. In fact, when assembling and tightening up the two collars of the coupling members or sockets the intermediate ring carried by one of these sockets engages the layer of ductile material registering therewith and forms therein an impression of corresponding cross-sectional configuration.

Other features and advantages of the coupling device of this invention will appear as the following description proceeds with reference to the attached diagrammatic drawings given by way of example and wherein:

FIG. 2 is a fragmentary section showing on a larger scale a detail of the same device, during the tightening of the pair of flanges thereof;

FIG. 3 is a fragmentary section showing a modified form of embodiment of the intermediate ring provided in this device;

FIGS. 5 and 6 are fragmentary sectional views showing two other forms of embodiment of the joint device of this invention.

Figure 1:
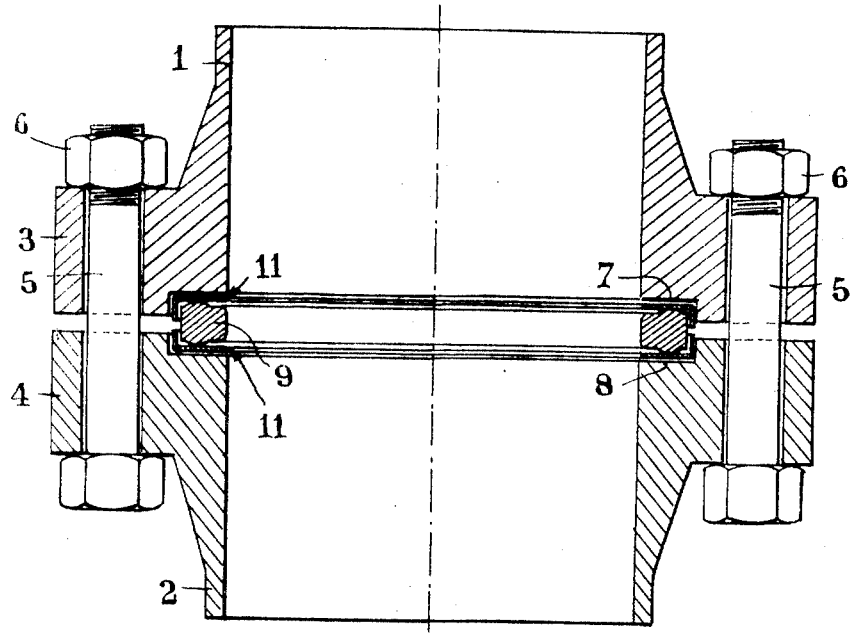
FIG. 1 is an axial section showing a first form of embodiment of the leak-proof pipe coupling device of this invention.

In the form of embodiment illustrated in FIGS. 1 and 2 of the drawing the leak-proof device according to this invention for connecting similar pipes or hoses comprises two tubular sockets 1 and 2 constituting two complementary connecting members adapted to be secured beforehand to the ends of the pipe sections or like elements to be assembled in a fluid-tight manner.

These tubular sockets are formed with integral flanges 3 and 4 adapted to be assembled by means of a plurality of bolts 5 and tightening nuts 6.

On their registering faces these flanges are formed with similar annular grooves 7 and 8 of substantially rectangular configuration in radial section. On the other hand, each groove communicates on one side with the internal bore of the corresponding socket. The machining of these grooves is therefore considerably simplified by their shape. Only the bearing face, i.e. their bottom, requires an accurate machining operation, but even this can be performed by using conventional machine tools.

According to an essential feature characterizing this invention the device further comprises an intermediate ring 9 adapted to be fitted in the registering grooves 7 and 8 of the pair of flanges 3 and 4.

This intermediate ring is made from a material of a hardness similar to that of said flanges. Thus, it may consist of stainless steel, and the assembling flanges may also be made from this or a similar material.

Moreover, this ring comprises on its opposite faces a portion of convex contour, which may consist for example of one or a plurality of annular beads 10.

Finally, the device according to the present invention comprises two sheets 11 of ductile material, disposed on either side of the intermediate ring 9. Thus, each sheet 11 is interposed between one face of said ring 9 and the registering bearing face of the corresponding groove.

The choice of the material adequate for making these sheets 11 is subordinate to the specific use for which the pipe or hose fitting is intended. The same applies to the selection of the proper thickness of these sheets; thus, a heat treatment may be applied thereto in order to modify their surface hardness. Thus, for instance, these sheets may consist of copper or any other suitable ductile material.

These sheets 11 are hollow and have the appearance of a flat washer. However, they can be preformed to a dished configuration so as to comprise a flanged outer edge 12. This flanged edge 12 is destined to engage the lateral face of the grooves formed in flanges 3 and 4 when fitting the two washers 11, in order to keep in position the intermediate ring 9 without resorting to any special tool for the assembling operation. Therefore, this arrangement greatly facilitates the positioning of the ring 9.

The two flanges 3 and 4 are assembled by means of bolts 5 located very close to the grooves 7 in order to reduce the diametral dimensions of the device. The steel grade of these bolts is selected according to the type of material from which the flanges are made, and also to the future application contemplated, notably in case of temperature variation in actual service.

When the flanges of the device of this invention are tightened up, the two opposite faces of the ring penetrate more or less into the registering layers of ductile material, thus forming therein an impression of corresponding cross-sectional contour (see FIG. 2). The convex contour or contours of this intermediate ring 9 assist in developing a local specific pressure higher than the mean pressure. Thus, in the example described hereinabove and illustrated in FIGS. 1 and 2, the contact is exerted by a half-tore against a plane so that the pressure is maximum at the top of the curve and decreases to the sides, whereby a perfect fluid-tightness is obtained.

However, the penetration of the beads 10 of ring 9 into the material of the pair of washers 11 is relatively reduced and the device is locked very rapidly. Without allowing the flanges to contact each other, the relative distance of the bearing faces of their grooves is easily calculated, with an approximation of a few thousandths of an inch. This constitutes an obvious advantage in mechanical assemblies and constructions.

The pipe coupling or joint device according to this invention, and more particularly of the type disclosed hereinabove with reference to FIGS. 1 and 2, proved to be extremely satisfactory in difficult applications, notably in the case of a pressure of $10^{-10}$ millibars attended by a temperature cycling at 300° C.

The intermediate ring 9 can be reused if the cares normally required by sealing gaskets are exerted. The sheets or washers 11 of ductile material are also liable to be reused several times.

In this respect, it may be noted that the coupling device according to this invention should not be construed as being limited by the use of sheets of ductile or plastic material. In fact, it is also possible to replace these sheets by a deposit of ductile material applied to both faces of the intermediate ring 9.

Thus, FIG. 3 illustrates a ring 9b of this character, of which both faces are coated with a layer 11b of ductile material which is obtained by depositing the corresponding material on the ring faces. Of course, the ring is also provided on either side with a convex bead or like annular projection 10b.

In this case, this ring can generally be reused by applying if necessary another layer of ductile or plastic material thereon.

Figure 4:
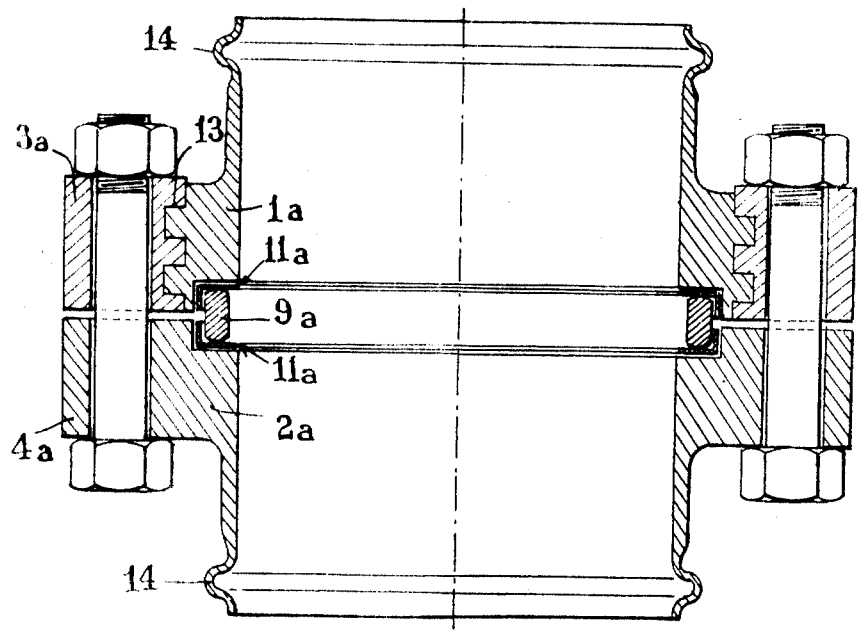
FIG. 4 is a view similar to FIG. 1 showing another form of embodiment of the device of this invention.

FIG. 4 illustrates another form of embodiment which is preferred in those cases where the clearance space available around the pipe or hose is limited or prevents the use of a fixed flange.

Only one of the tubular sockets 1a and 2a of this device comprises a fixed flange 4a. In fact, the other socket 1a carries a flange-forming screw ring 3a having to this end with inner threads 13 engaging corresponding external threads formed on the socket 1a. Preferably, these threads are square-sectioned. Thus, the screw ring 3a ensures the continuity of the tightening effort, as contrasted with a counter-flange made of two parts or halves.

Moreover, the use of square-sectioned threads permits different thermal expansions between the two corresponding parts without causing any relaxation in the tightening effort, as contrasted with the use of triangular-sectioned threads.

On the other hand, the intermediate ring 9a provided in the device illustrated in FIG. 4 has a different configuration in radial section, as compared with the ring 9 of the preceding form of embodiment.

In fact, the two opposite faces of this ring 9a are not provided with an annular bead, but their cross-sectional contour is convex and the width of the ring section is relatively small. Thus, the two faces of the ring can form an impression in the two corresponding washers 11a of ductile material when the flanges 3a and 4a are tightened, in order to provide the necessary fluid-tightness.

Finally, in the same form of embodiment the outer ends of the two sockets 1a and 2a comprise a corrugated expansion-absorbing portion 14 adapted to be welded to the corresponding end of the pipe section. The presence of this corrugated portion 14 avoids the distortion of the bearing faces of the grooves formed in the corresponding flanges when welding the assembly.

In the above-described forms of embodiment the use of flanges assembled by bolts is contemplated. However, in certain cases these flanges are objectionable on account of their excessive diametral dimensions. This is observed notably when it is desired to interconnect a pair of pipe sections of relatively small diameter, as the corresponding flanges assembled by bolts would appear to be out of proportion.

Therefore, it is proposed another form of embodiment of the pipe coupling of this invention, as shown in FIG. 5, which is designed with a view to avoid the use of bolt-assembled flanges.

In the corresponding device the two tubular coupling sockets 1c and 2c carry integral shallow collars or flanges 3c and 4c of reduced width.

These two collars or flanges 3c and 4c are assembled and clamped by means of a pair of screw rings 15 and 16 engaging each other as shown, each ring having an inner shoulder adapted to engage the relevant collar or flange.

This device differs from the preceding ones in that the intermediate ring provided between the two tubular sockets is carried by the collar or flange of one of these sockets.

In fact, this ring consists simply of an annular bead 9c formed on the outer face of the collar or flange 3c of socket 1c registering with the other collar or flange of the opposite socket 2c. This bead has a convex cross-sectional contour since it constitutes a substitute for the separate ring of the preceding forms of embodiment.

Registering with this convex bead is a sheet 11c of ductile material which is thus disposed between the ring-forming bead and the other collar or flange 4c of the device.

This sheet is hollowed and constitutes a kind of washer. However, its outer edge may be flanged to provide a shallow collar 12c for properly positioning the sheet before tightening up the assembly.

The sheet 11c may be made from any suitable ductile material, the choice of this material depending on the specific use for which the device is intended. Thus, the collars or flanges 3c and 4c may consist of stainless steel and formed integrally with the sockets 1c and 2c, the sheet 11c consisting for example of copper, silver, nickel, aluminium, etc., or any other suitable material somewhat softer than the members compressing it.

To obtain the desired fluid-tightness of the joint, it is only necessary to screw the external ring 15 on the internal ring 14. In fact, these rings engage with their inner shoulders the corresponding collars or flanges 3c and 4c which are thus clamped against each other. Under these conditions, the convex bead 9c of the collar or flange 3c will form an impression of same cross-sectional contour in the sheet 11c of ductile material, thus warranting a reliable and perfect fluid-tightness.

However, this device is also advantageous in that it has reduced over-all dimensions. This is due essentially to the fact that the flanges assembled by bolts are replaced by simple collars of relatively reduced diametral dimension, one of these collars carrying a bead replacing the intermediate ring of the preceding forms of embodiment.

If desired, an annular clearance 17 may be provided around the collars 3c and 4c, one of the clamping rings, namely ring 15, having passages 18 formed therein which open into the gap thus formed to permit the ingress of a tracing gas for detecting the presence of leakages.

On the other hand, the two tubular sockets 1c and 2c may advantageously be provided with a pair of circlips or spring rings 19 for retaining the clamping rings 15 and 16 when these are separated from each other. Thus, the circlips act as stops to retain these rings in such positions that they cannot be loosened from the corresponding collars 3c and 4c while protecting these collars against possible shocks in their disassembled condition.

FIG. 6 shows a modified form of embodiment of the device of this invention. In this alternate arrangement the flange 3d of tubular socket 1d, which carries the bead portion 9c, has an annular groove 20 formed around this bead portion. The function of this groove is to receive the edge 12d of the corresponding flange 11d of ductile material, in order properly to position this washer before clamping or tightening the assembly.

However, it is clear that the pipe coupling device of this invention may be embodied in many different manners without departing from the basic principles of the invention.

In this respect it may be pointed out that the sheet of ductile material may be replaced by a plurality of superposed sheets or laminations. Moreover, as already explained in the foregoing, this sheet may be replaced by a deposit or coating of ductile or plastic material on the intermediate ring 9 or 9a, or on the intermediate bead 9c.

However, this coating of ductile material may also be provided on the portions of said flanges or collars which register with said intermediate ring 9 or 9a, or of said bead 9c.

Besides, the cross-sectional contour of this ring or intermediate bead may differ from the shapes illustrated herein by way of example.

Moreover, it will be readily understood by those conversant with the art that in the form of embodiment described hereinabove with reference to FIG. 5 it is possible to assemble and clamp or tighten the two collars 3c and 4c by using means other than the screw rings 15 and 16 illustrated.

As already explained hereinabove, the device of this invention affords a perfect, reliable and lasting fluid-tightness of the joint. However, it is characterised by additional features such as:

the absence of any slippage between mutually contacting surfaces in the sealing zone;

the moderate thickness of the sealing layer of ductile material, as the creep decreases with the thickness of the compressed material;

the shape of the bearing faces of the device which provides a specific pressure sufficient to produce a distortion while limiting creep by increasing the contact area;

the preservation of the internal energy in the assembly to compensate any "micro-creep" likely to develop with time;

the use of simple geometrical shapes making it unnecessary to use high-precision machining;

the efficient protection of the essential sealing faces (on the flange side);

the uniform distribution of tightening stress, and the possibility of reusing the component elements.

What I claim is:

1. A fluid-tight joint for a pair of substantially aligned tubular members each provided at an end thereof facing the other member with an annular groove extending from the inner surface of the respective member into the same and being defined by a substantially plane face transverse to the axis of the respective member and being arranged adjacent and substantially parallel to the corresponding face of the other tubular member and an annular surface extending substantially normal to said plane face radially outwardly from said inner surface, said joint comprising a pair of washers of ductile material each abutting with a first portion thereof against the plane face of a respective one of said pair of tubular members and each having an annular edge portion extending transverse to said first portion and abutting against said annular surface of the groove in the respective member; an intermediate ring having a hardness similar to that of said tubular members and being arranged between said washers and having a pair of opposite convex faces respectively engaging said washers; and means connected to said tubular members for forcibly drawing said plane faces thereof toward each other and for thereby pressing said convex faces of said ring into said washers of ductile material and the washers against said plane faces of said members.

2. A fluid-tight joint as defined in claim 1, wherein said annular edge portion of each washer extends into an annular groove provided in an outer annular portion of said intermediate ring which abuts with said convex faces thereof respectively against said first portions of said washers.

References Cited

UNITED STATES PATENTS

| | | | |
|---|---|---|---|
| 906,761 | 12/1908 | White | 285—336 |
| 959,702 | 5/1910 | Blanchard et al. | 285—329 |
| 1,715,854 | 6/1929 | McKenzie-Martin | 285—331 |
| 2,307,440 | 1/1943 | Wilson | 277—271 |
| 2,863,679 | 12/1958 | Dunbar | 285—336 |
| 3,248,119 | 4/1966 | Smith et al. | 285—363 X |

FOREIGN PATENTS 1,373,072  8/1964  France.

DAVID J. WILLIAMOWSKY, Primary Examiner

W. L. SHEDD, Assistant Examiner

U.S. Cl. X.R.

285—363, 379